(12) United States Patent
Li et al.

(10) Patent No.: US 8,434,914 B2
(45) Date of Patent: *May 7, 2013

(54) LENS GENERATING A BATWING-SHAPED BEAM DISTRIBUTION, AND METHOD THEREFOR

(75) Inventors: Ming Li, Acton, MA (US); Yi Yang, Peabody, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 154 days.

This patent is subject to a terminal disclaimer.

(21) Appl. No.: 13/023,571

(22) Filed: Feb. 9, 2011

(65) Prior Publication Data

US 2011/0141734 A1   Jun. 16, 2011

Related U.S. Application Data

(63) Continuation-in-part of application No. 12/636,524, filed on Dec. 11, 2009.

(51) Int. Cl.
*F21V 5/04* (2006.01)

(52) U.S. Cl.
USPC ............................. 362/335; 362/307; 362/309

(58) Field of Classification Search ............ 362/311, 362/307, 309, 335; 359/653
See application file for complete search history.

(56) References Cited

U.S. PATENT DOCUMENTS

| | | |
|---|---|---|
| 2,215,900 A | 9/1940 | Bitner |
| 2,254,961 A | 9/1941 | Harris |
| 2,469,080 A | 5/1949 | Rosin et al. |
| 2,515,584 A | 7/1950 | Benson |
| 4,414,609 A | 11/1983 | Shemitz |
| 4,667,481 A | 5/1987 | Watanabe et al. |
| 4,767,172 A | 8/1988 | Nichols et al. |
| 4,907,044 A | 3/1990 | Schellhorn et al. |
| 5,027,258 A | 6/1991 | Schoniger et al. |

(Continued)

FOREIGN PATENT DOCUMENTS

| | | |
|---|---|---|
| DE | 297 17 444 U1 | 2/1998 |
| DE | 298 14 243 U1 | 12/1998 |

(Continued)

OTHER PUBLICATIONS

Klaus Schmid, International Search Report and Written Opinion of the International Searching Authority, Apr. 8, 2011, pp. 1-10, European Patent Office, Rijswijk, The Netherlands.

(Continued)

*Primary Examiner* — Mary Ellen Bowman
(74) *Attorney, Agent, or Firm* — Shaun P. Montana

(57) ABSTRACT

A lens to redirect light, having an angular distribution centered around a left-right symmetry plane (LRSP), from a light source. The lens includes an incident face, facing the light source, which includes an incident corner, which divides the incident face into incident inner and outer zones and is concave, forming an obtuse angle in air. The lens also includes an opposite exiting face, which similarly includes an exiting corner, which similarly divides the exiting face. Each ray striking the incident inner zone transmits through the lens, striking the exiting inner zone. Each ray striking the incident outer zone transmits through the lens, striking the exiting outer zone. Each ray striking the incident face, transmits through the lens, strikes the exiting face, and refracts out of the lens, has initial and final propagation angles with respect to the LRSP. The final propagation angle is greater than the initial propagation angle.

20 Claims, 13 Drawing Sheets

U.S. PATENT DOCUMENTS

| | | | |
|---|---|---|---|
| 5,471,372 | A | 11/1995 | Mamelson et al. |
| 5,526,190 | A | 6/1996 | Hubble, III et al. |
| 5,607,227 | A | 3/1997 | Yasumoto et al. |
| 6,179,434 | B1 | 1/2001 | Saraiji |
| 6,547,423 | B2 | 4/2003 | Marshall et al. |
| 6,578,979 | B2 | 6/2003 | Truttmann-Battig |
| 6,582,103 | B1 | 6/2003 | Popovich et al. |
| 6,632,100 | B1 | 10/2003 | Richardson |
| 6,638,088 | B1 | 10/2003 | Richardson |
| 6,641,419 | B1 | 11/2003 | Richardson |
| 6,724,543 | B1 | 4/2004 | Chinniah et al. |
| 6,755,556 | B2 | 6/2004 | Gasquet et al. |
| 6,762,562 | B2 | 7/2004 | Leong |
| 6,773,130 | B1 | 8/2004 | Richardson |
| 6,853,151 | B2 | 2/2005 | Leong et al. |
| 6,896,381 | B2 | 5/2005 | Benitez et al. |
| 6,936,968 | B2 | 8/2005 | Cross et al. |
| 6,953,271 | B2 | 10/2005 | Aynie et al. |
| 7,021,797 | B2 | 4/2006 | Minano et al. |
| 7,067,992 | B2 | 6/2006 | Leong et al. |
| 7,111,964 | B2 | 9/2006 | Suehiro et al. |
| 7,121,675 | B2 | 10/2006 | Ter-Hovhannisian |
| 7,254,309 | B1 | 8/2007 | Chou et al. |
| 7,270,454 | B2 | 9/2007 | Amano |
| 7,329,029 | B2 | 2/2008 | Chaves et al. |
| 7,465,074 | B2 | 12/2008 | Blumel |
| 7,473,013 | B2 | 1/2009 | Shimada |
| 7,490,957 | B2 | 2/2009 | Leong et al. |
| 7,507,001 | B2 | 3/2009 | Kit |
| 7,731,395 | B2 | 6/2010 | Parkyn et al. |
| 7,798,679 | B2 | 9/2010 | Kokubo et al. |
| 7,847,480 | B2 | 12/2010 | Yoneda |
| 7,880,188 | B2 | 2/2011 | Blumel et al. |
| 7,942,558 | B2 | 5/2011 | Zweig et al. |
| 2005/0201118 | A1 | 9/2005 | Godo |
| 2006/0232961 | A1 | 10/2006 | Pfund |
| 2008/0054281 | A1 | 3/2008 | Narendran et al. |
| 2008/0198600 | A1 | 8/2008 | Crandell et al. |
| 2009/0002990 | A1 | 1/2009 | Becker et al. |
| 2009/0059620 | A1 | 3/2009 | Chen |
| 2009/0225543 | A1 | 9/2009 | Jacobson et al. |
| 2009/0284951 | A1 | 11/2009 | Muschaweck |
| 2010/0027256 | A1 | 2/2010 | Kinoshita |
| 2010/0195335 | A1 | 8/2010 | Allen et al. |
| 2011/0085336 | A1 | 4/2011 | Blumel et al. |

FOREIGN PATENT DOCUMENTS

| | | |
|---|---|---|
| EP | 0 751 340 A2 | 1/1997 |
| EP | 0 971 186 B1 | 1/2000 |
| EP | 1 717 627 A1 | 11/2006 |
| EP | 1 860 467 A1 | 11/2007 |
| JP | 2009043686 A | 2/2009 |
| WO | 98/14740 A1 | 4/1998 |
| WO | 2008/090574 A1 | 7/2008 |
| WO | 2009/052172 A2 | 4/2009 |
| WO | 2012072387 A1 | 6/2012 |

OTHER PUBLICATIONS

Klaus Schmid, International Search Report and Written Opinion of the International Searching Authority for PCT/US12/23965, Jun. 1, 2012, pp. 1-10, European Patent Office, Rijswijk, The Netherlands.

LENS GENERATING A BATWING-SHAPED BEAM DISTRIBUTION, AND METHOD THEREFOR

CROSS-REFERENCE TO RELATED APPLICATION

The present application is a continuation-in-part of U.S. patent application Ser. No. 12/636,524, filed Dec. 11, 2009 and entitled "RETROFIT-STYLE LAMP AND FIXTURE, EACH INCLUDING A ONE-DIMENSIONAL LINEAR BATWING LENS", the entire contents of which are hereby incorporated by reference.

TECHNICAL FIELD

The present invention relates to lamps, and more specifically, to retrofit-style lamps incorporating a lens.

BACKGROUND

Enclosed storage structures, such as refrigeration cases, have long had light sources and light fixtures disposed within to provide light to anyone accessing an item or items stored within the structure. Typically, such a fixture uses one or more fluorescent bulbs, usually in the shape of a tube, to disperse light within the enclosed space defined by the storage structure. Such fixtures may be located along the front corners of a vertically-elongated storage structure, such as on either side of a door that opens to the left or right, or may be located along a top corner or a front edge, when the storage structure is horizontally-elongated. When a fluorescent tube breaks or otherwise ceases to function for any reason, the non-functioning tube is removed, and a new one is put into the fixture.

While fluorescent tubes are reasonably low in cost, and maintenance of fixtures including fluorescent tubes is reasonably easy and also low cost, a typical fluorescent-based bulb is not as energy-efficient or as long-lasting as a typical light emitting diode (LED) light source. Thus, lamps and fixtures that employ LEDs instead of fluorescent tubes are becoming increasingly popular.

SUMMARY

Conventional techniques for providing light within an enclosed storage structure, such as a refrigeration case, using an LED-based light source suffer from a variety of faults. A conventional LED-based fixture typically requires a 1:1 ratio between the LED sources and the optics used, and thus the optics is typically injection molded. That is, each LED chip has its own optic (i.e., lens). This is due, in part, to attempting to compensate for the less-than uniform distribution of light a conventional LED-based fixture provides, compared to a conventional fluorescent-based fixture. For a typical fixture measuring four feet in length, there may be ten or twelve lenses present. In some configurations, should a lens break or otherwise need to be replaced, it is not possible to simply replace the single lens, but rather the entire fixture must be replaced. The same is true for the LED chips in some configurations (i.e., if one chip breaks or otherwise needs to be replaced, the entire fixture must be replaced, not just the one chip, or an array of chips). This makes a conventional LED-based light source more expensive to maintain over time than conventional fluorescent light sources, despite the cost savings of using more energy efficient LEDs in place of conventional fluorescent light sources.

Further, the 1:1 ratio between the LEDs/LED chips and the optics means that a retrofit-style option replacement of a conventional light source is impossible. (A retrofit-style option is one where a conventional light source in an existing fixture is replaced by an LED-based light source and appropriate changes are further made to the ballast and/or the power supply of the existing fixture, so as to allow the fixture to properly power and operate the LEDs. Thus, a retrofit-style replacement may result in the replacement of not only the light source, but also the existing ballast and/or power supply of the existing fixture. In contrast, a true retrofit option would replace the conventional light source in an existing fixture with an LED-based light source, but would not require any changes to the already-existing ballast and/or power supply.) That is, the 1:1 ratio makes it impossible to add an LED-based light source and its related optics to an already-existing fixture, where they would replace the conventional fluorescent tube (leaving aside the issue of whether the current ballast and/or power supply used by the already-existing fixture would be capable of supporting the LEDs). The entire fixture must be removed and replaced, adding to installation costs in comparison to a retrofit-style solution. Further, conventional LED-based fixtures for refrigeration cases and similar structures are typically larger and bulkier in terms of space occupied than conventional fluorescent fixtures for the same structures. In some structures, the conventional LED-based fixture will not fit into the structure properly. In other structures, even if the conventional LED-based fixture does fit, it takes up more space than a conventional fluorescent fixture, leaving less space for products within the case or structure.

Embodiments of the present invention provide a retrofit-style solution for use with fixtures already located within enclosed storage structures, such as but not limited to refrigeration cases and other similar structures. The retrofit-style solution lamp described herein may use LED-based light sources, making it more energy-efficient and having a longer life than conventional light sources, such as conventional fluorescent tube lamps, and has its own incorporated optic that produces a dispersion of light that better illuminates an enclosed storage structure, such as a refrigeration case. When configured as a retrofit-style lamp, the solution replaces a conventional fluorescent tube lamp, providing the energy-efficiency and long life benefits of LED-based light sources. When configured as a fixture, the solution replaces existing conventional fluorescent fixtures as well as existing conventional LED-based fixtures with a fixture that provides energy efficiency, longer life, and a better dispersion of light, as well as being easier and less expensive to maintain and repair.

In an embodiment, there is provided a lens to redirect light from at least one light source. The light has an angular distribution centered around a left-right symmetry plane. The lens includes an incident face facing the at least one light source, the incident face including at least one incident corner at which the local surface slope changes abruptly, the at least one incident corner dividing the incident face into an incident inner zone and an incident outer zone, the at least one incident corner being concave and forming an obtuse angle in air. The lens also includes an exiting face opposite the incident face and including at least one exiting corner at which the local surface slope changes abruptly, the at least one exiting corner dividing the exiting face into an exiting inner zone and an exiting outer zone. For each ray of the light from the at least one light source that strikes the incident inner zone and transmits through the lens, the ray strikes the exiting inner zone. For each ray of the light from the at least one light source that strikes the incident outer zone and transmits through the lens, the ray strikes the exiting outer zone. For each ray of the light from the at least one light source that strikes the incident face, transmits through the lens, strikes the exiting face, and refracts out of the lens, the ray has initial and final propagation angles formed with respect to the left-right symmetry plane, and the final propagation angle is greater than the initial propagation angle.

In a related embodiment, the lens may be symmetric about the left-right symmetric plane. In another related embodiment, the light may have a two-dimensional angular distribution centered about a symmetry axis, and the lens may be rotationally symmetric about the symmetry axis. In yet another related embodiment, the lens may be asymmetric about the left-right symmetry plane. In still another related embodiment, the lens may have a uniform cross-section along its entire longitudinal length.

In yet still another related embodiment, for each ray of the light from the at least one light source that strikes the incident inner zone, transmits through the lens and strikes the exiting inner zone, the ray may undergo total internal reflection at the exiting inner zone. In still yet another related embodiment, the incident inner zone may be essentially planar. In yet still another related embodiment, the exiting inner zone may include a pair of surfaces that form a convex wedge. In still yet another embodiment, the incident outer zone may be concave. In yet still another embodiment, the exiting outer zone may be convex.

In another embodiment, there is provided a method of redirecting light from at least one light source, the light having an angular distribution centered around a left-right symmetry plane. The method includes: refracting a central portion of the angular distribution through a proximal surface of a lens; transmitting the refracted central portion through the lens; totally internally reflecting the refracted central portion from a distal surface of the lens; refracting the totally internally reflected central portion through the distal surface of the lens to exit the lens; refracting a peripheral portion of the angular distribution through the proximal surface of the lens; transmitting the refracted peripheral portion through the lens; and refracting the transmitted peripheral portion through the distal surface of the lens to exit the lens; wherein the distal surface of the lens includes at least one generally flat portion that does not receive any light from the angular distribution; and wherein the central portion and the peripheral portion of the angular distribution refract through the distal surface on opposite sides of the generally flat portion.

In a related embodiment, the central portion may refract through an incident inner zone on the proximal surface of the lens, then may transmit through the lens, then may totally internally reflect off a central surface on the distal surface of the lens, then may transmit to a high-incident-angle surface on the distal surface of the lens, then may refract through the high-incident-angle surface to exit the lens. In another related embodiment, the central portion may refract through an incident inner zone on the proximal surface of the lens, then may transmit through the lens, then may totally internally reflect off a high-incident-angle surface on the distal surface of the lens, then may transmit to a central surface on the distal surface of the lens, then may totally internally reflect off the central surface on the distal surface of the lens, then may transmit to the high-incident-angle surface on the distal surface of the lens, then may refract through the high-incident-angle surface to exit the lens. In yet another related embodiment, the peripheral portion may refract through an incident outer zone on the proximal surface of the lens, then may transmit through the lens, then may refract through an exiting outer zone on the distal surface of the lens to exit the lens.

In another embodiment, there is provided a lens to redirect light from at least one light source, the light having an angular distribution centered around a longitudinal axis. The lens includes: an incident face facing the at least one light source, wherein a planar half-cross-section of the incident face, taken perpendicular to the longitudinal axis and extending away from the longitudinal axis, includes: a central portion that straddles the longitudinal axis; and a peripheral portion extending away from the central portion, the peripheral portion forming a corner with the central portion at which the local surface slope changes abruptly, the peripheral portion forming an obtuse angle in air with the central portion; and an exiting face opposite the incident face and facing away from the at least one light source, wherein a planar half-cross-section of the exiting face, taken perpendicular to the longitudinal axis and extending away from the longitudinal axis, includes: a central surface forming a concave corner at the longitudinal axis; a high-incident-angle surface extending from the central surface generally toward the at least one light source and forming a convex wedge with the central surface, the high-incident angle surface forming an angle greater than 270 degrees in air with the central surface; and a partially curved surface extending from the high-incident-angle surface, the partially curved surface forming a corner with the high-incident-angle surface at which the local surface slope changes abruptly.

In a related embodiment, the incident and exiting faces may be generalized cylinders. In another related embodiment, the incident and exiting faces may be rotationally symmetric around the longitudinal axis. In still another related embodiment, the partially curved surface may have a flat or monotonically decreasing surface height at each point on the partially curved surface, with respect to observation planes taken perpendicular to the longitudinal axis. In yet another related embodiment, the incident face of the lens may include a generally flat planar portion at its periphery, the generally flat planar portion being perpendicular to the longitudinal axis, and the partially curved surface may be farthest away from the generally flat planar portion at the corner between the partially curved surface and the high-incident-angle surface. In still yet another related embodiment, the partially curved surface may have a generally flat portion proximate the corner between the partially curved surface and the high-incident-angle surface, and no light rays leaving the at least one light source and refracting through the incident face of the lens directly strike the generally flat portion.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments described herein show a novel retrofit-style lamp suitable for use in storage units such as refrigeration cases. The retrofit-style lamp incorporates its own lens instead of relying on a lens attached to the fixture in which the lamp is placed. The lens is a one-dimensional linear batwing lens, which produces a batwing type of beam pattern by beam shaping light from a plurality of light sources, which may include LED-based light sources. The lens is extruded and is able to be used with any number of light sources. The lamp also includes a housing to which the light sources and the lens are attached, with endcaps including electrical pin connectors affixed to each end of the housing. The endcaps, through the electrical pin connectors, allow the light sources to receive power and produce light, which the incorporated one-dimensional linear batwing lens spreads in a substantially uniform pattern through the storage unit. Thus, the endcaps allow the lamp to be placed in any type of fixture that accepts fluorescent lamp tubes. The retrofit-style lamp may also be modified by removing the endcaps and adding covers with appropriate electrical connectors so as to be used as a fixture, directly attached to a storage unit in replacement of a conventional fluorescent lamp fixture.

Figure 1:
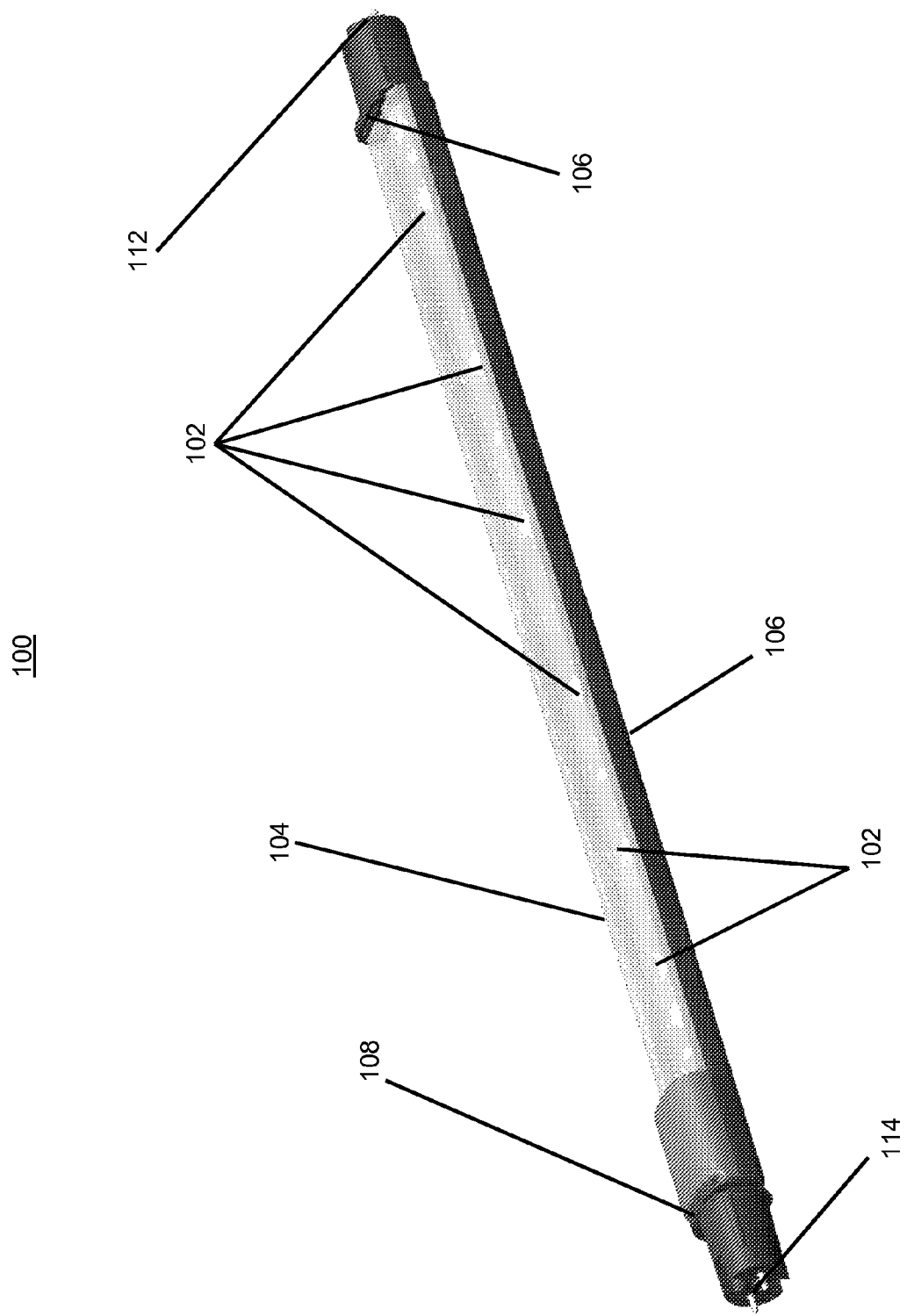
FIG. 1 shows a retrofit-style lamp including a one-dimensional linear batwing lens according to embodiments disclosed herein.
Figure 2:
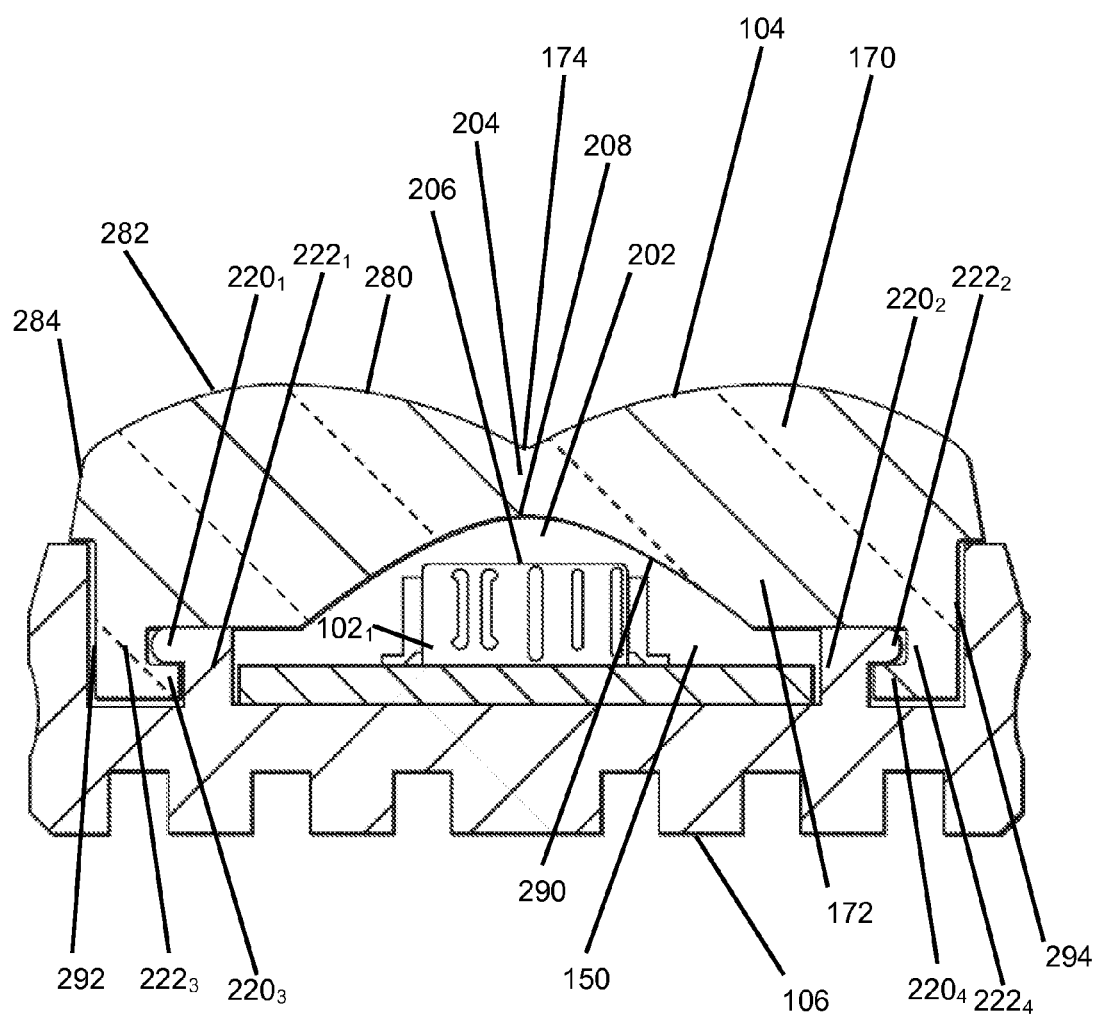
FIG. 2 illustrates a sectional cross-view of a housing including attached light sources and an attached one-dimensional linear batwing leans.
Figure 3:
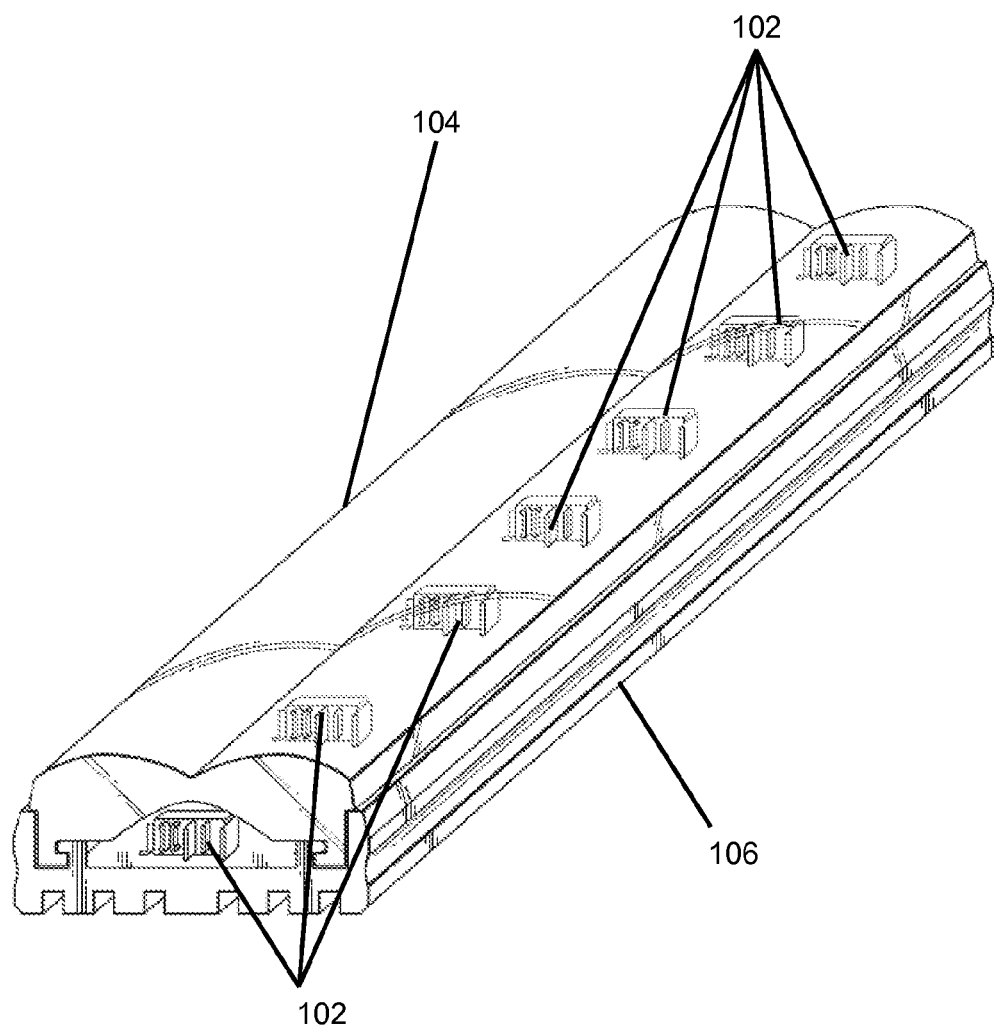
FIG. 3 shows a profile view of an open-ended light fixture having a housing including attached light sources and an attached one-dimensional linear batwing lens, wherein the light sources are not powered and the interior of the housing is visible though the lens.

FIG. 1 shows a retrofit-style lamp 100 (including and corresponding to a cross-sectional view 200 in FIG. 2 and a profile sectional view 300 in FIG. 3) including a plurality of light sources 102, a one-dimensional linear batwing lens 104, a housing 106, a pair of endcaps 108 and 110, and a pair of electrical connectors 112 and 114. Thus, the one-dimensional linear batwing lens 104 is incorporated into the retrofit-style lamp 100, such that the fixture (not shown) into which the retrofit-style lamp 100 is placed does not need to have an optic or optics (i.e., lens/lenses) of its own. The retrofit-style lamp 100 is suitable for placement in any type of fixture, such as but not limited to a conventional fluorescent tube lamp fixture (not shown). The one-dimensional linear batwing lens 104 is coupled to the housing 106, as seen most easily in FIG. 2, to form an outer body of the retrofit-style lamp 100. The one-dimensional linear batwing lens 104 may be coupled to the housing 106 in any known way. For example, in some embodiments, the one-dimensional linear batwing lens 104 and the housing 106 are each shaped so as to form as interlocking connection. An example of such an interlocking connection is shown in FIG. 2, where the one-dimensional linear batwing lens 104 and the housing 106 each include a tab $220_N$ attached to a post $222_N$, such that the tabs $220_3$ and $220_4$ on the one-dimensional linear batwing lens 104 may be slid into the two cavities created by the tabs $220_1$ and $220_2$ and the posts $222_1$ and $222_2$ of the housing 106, keeping the one-dimensional linear batwing lens 104 and the housing 106 connected. Note that the tabs $220_N$ and the posts $222_N$, in some embodiments, are created from the same material as the housing 106 and/or the one-dimensional linear batwing lens 104 and are a solid part of the housing 106 and/or the one-dimensional linear batwing lens 104, such that the tabs $220_N$ and the posts $222_N$ are created when the housing 106 and/or the one-dimensional linear batwing lens 104 is created (i.e., shaped). Alternatively, in some embodiments, the tabs $220_N$ and the posts $222_N$ are separate from the housing 106 and/or the one-dimensional linear batwing lens 104 and must be connected or otherwise attached thereto (e.g., by use of an epoxy or other adhesive material, or through use of a mechanical connection). Alternatively, in some embodiments, the posts $222_N$ are a solid part of the housing 106 and/or the one-dimensional linear batwing lens 104, as described above, and the tabs $220_N$ are separate and must be connected or otherwise attached to the corresponding posts $222_N$ (e.g., by use of an epoxy or other adhesive material, or through use of a mechanical connection). Further, in some embodiments, the connection of the housing 106 and the one-dimensional linear batwing lens 104 is outside of the active optical field of the one-dimensional linear batwing lens 104, so that the housing 106 retains and supports the one-dimensional linear batwing lens 104 without disturbing the beam pattern created by the beam shaping of the one-dimensional linear batwing lens 104, acting on light from the plurality of light sources 102. Thus, it is possible to exchange a different lens (including a different one-dimensional linear batwing lens) for the one-dimensional linear batwing lens 104 that is originally part of the retrofit-style lamp 100, should (for example) the original one-dimensional linear batwing lens 104 break or otherwise need to be replaced, or should a different optic be necessary and/or desired for the retrofit-style lamp 100.

The housing 106 may be made of any material that serves a thermal management function. Thus, in some embodiments, the housing 106 serves as a heat sink for any heat created by the retrofit-style lamp 100 and/or any of its components, such as heat created by, for example, the plurality of light sources 102). The housing 106 is also extrudable (i.e., may be formed having a desired cross-section by being forced through a die). In some embodiments, the housing 106 is made of aluminum. In other embodiments, the housing 106 may be made of, for example but not limited to, sheet metal, a plastic material, and the like. The housing 106 may be of any shape that allows the retrofit-style lamp 100 to fit into a lighting fixture. The housing 106, as described above, must be able to be connected to the one-dimensional linear batwing lens 104, using, for example, any of the connection mechanisms described above. In some embodiments, the housing 106 has a low profile, which allows the retrofit-style lamp 100 to be placed into, for example, conventional fluorescent tube fixtures. In some embodiments, upper walls 240 of the housing 106 (seen most easily in FIG. 2) provide a precise mechanical cutoff at edges 242 of the housing 106 to eliminate reverse glare from the plurality of light sources 102.

The pair of electrical connectors 112 and 114 are located, respectively, on either end of the retrofit-style lamp 100. The first of the pair of electrical connectors 112 is attached to a first end 182 of the housing 106, and the second of the pair of electrical connectors 114 is attached to a second end 184 of the retrofit-style lamp 100. The pair of electrical connectors 112 and 114 may be any known type of electrical connector, such as but not limited to a pair of two-pin connector as is typically used on conventional fluorescent lamp tubes. The pair of electrical connectors 112 and 114 provide the retrofit-style lamp 100 with power received from the fixture (not shown) into which the retrofit-style lamp 100 is placed. The power received by the pair of electrical connectors 112 and 114 is sent to the plurality of light sources 102 through any power-conducting material, such as but not limited to wire, or pin connectors located on a printed circuit board (PCB) that includes any number of the plurality of light sources 102. The pair of electrical connectors 112 and 114, in some embodiments, are connected to the joined one-dimensional linear batwing lens 104 and housing 106 (which may be considered to be a lens-housing combination). In some embodiments, the pair of electrical connectors 112 and 114 are directly connected to the lens-housing combination. Alternatively, as is shown in FIG. 1, the pair of endcaps 108 and 110 is interposed between the lens-housing combination and the pair of electrical connectors 112 and 114. That is, either of the pair of endcaps 108 and 110 is connectable between one of the pair of electrical connectors 112 and 114, and the lens-housing combination. For example, as shown in FIG. 1, a first of the pair of endcaps 108 is connected between the first of the pair of electrical connectors 112 and the interconnected one-dimensional linear batwing lens 104 and the housing 106, and the second of the pair of endcaps 110 is connected between the second of the pair of electrical connectors 114 and the interconnected one-dimensional linear batwing lens 104 and the housing 106. Thus, any electrical connection between either or both of the pair of electrical connectors 112 and 114 and the plurality of light sources 102 must be maintained (i.e., not interrupted, severed, or otherwise blocked by) the pair of endcaps 108 and 110. In some embodiments, the pair of endcaps 108 and 110, with the exception of an electrical connection to the pair of electrical connectors 112 and 114, seal off the interior of the interconnected one-dimensional linear batwing lens 104 and the housing 106 (i.e., the lens-housing combination). The pair of endcaps 108 and 110 may be made of any material that is able to withstand any heat generated by the retrofit-style lamp 100 without becoming deformed, and without either of the pair of endcaps 108 and 110 becoming disengaged or otherwise disconnected from the other components of the retrofit-style lamp 100. In some embodiments, an endcap and an electrical connector may be a single component, while alternatively, in other embodiments, an endcap and an electrical connector may be discrete components that must be connected in some manner. Both the pair of endcaps 108 and 110 and the pair of electrical connectors 112 and 114 may be joined to other components of the retrofit-style lamp 100 using any available connection mechanisms and/or materials (for example, but not limited to, mechanical connections, adhesive-based connections, combinations thereof, and so on). In some embodiments, one or both of the pair of endcaps 108 and 110 may be shaped or otherwise formed so that, when the retrofit-style lamp 100 is placed into a fixture, proper engagement of the retrofit-style lamp 100 with the fixture results in the endcap/endcaps "locking" the retrofit-style lamp 100 into place, or otherwise indicating that the retrofit-style lamp 100 has been properly installed into the fixture. In some embodiments, this functionality is found on one or both of the pair of electrical connectors 112 and 114. Alternatively, in some embodiments where the pair of endcaps 108 and 110 and the pair of electrical connectors 112 and 114 are formed into a pair of single pieces (i.e., an endcap-electrical connector combination), the "locking" and/or indicator functionality described above is found in one or both of the endcap-electrical connector combinations.

As seen in FIGS. 2 and 3, the plurality of light sources 102 is arranged within a space 150 defined in part by the housing 106. The space 150 may also be defined in part by the one-dimensional linear batwing lens 104, as well as, or alternatively by, the connection mechanism between the housing 106 and the one-dimensional linear batwing lens 104. The plurality of light sources 102 may be any type of light source capable of producing light that may be beam shaped by the one-dimensional linear batwing lens 104. In some embodiments, the plurality of light sources 102 are a plurality of light-emitting diode(LED)-based light sources, such as but not limited to a plurality of light-emitting diodes (LEDs), a plurality of organic light-emitting diodes (OLEDs), combinations thereof, and the like. In some embodiments, the retrofit-style lamp 100 uses Golden Dragon® LEDs made by OSRAM Opto Semiconductors of Regensburg, Germany, and Sunnyvale, Calif., USA. A single LED $102_1$ is shown in FIG. 2. The plurality of LED-based light sources may be arranged, as is well-known in the art, on one or more printed circuit boards (PCBs) that extend from one part of the retrofit-style lamp 100 to another. Where two or more PCBs are used in the retrofit-style lamp 100, the PCBs are electrically connected to each other to allow all of the LED-based light sources on all the PCBs to be powered from the same source (e.g., the fixture into which the retrofit-style lamp 100 is attached). Any PCBs used are sized to fit within the retrofit-style lamp 100, which in some embodiments is approximately 1.5 inches wide at its widest point. The one-dimensional linear batwing lens 104 beam shapes light emitted by at least two light sources of the plurality of light sources. The dispersion of light created (i.e., beam shaped) by the one-dimensional linear batwing lens 104 is a batwing dispersion, regardless of the number of the light sources, or type of light sources, used. Thus, it possible to use any number of light sources, including any number of LEDs, with the one-dimensional linear batwing lens 104; for example, see FIG. 3. The one-dimensional linear batwing lens 104 therefore may be said to be scalable, such that no change is required to the lens to produce a batwing dispersion even if the number of light sources used in the retrofit-style lamp 100 changes.

As shown most clearly in FIG. 2, which is a cross-section of the retrofit-style lamp 100 shown in FIG. 1, and FIG. 3, which is a profile view of a section of the retrofit-style lamp 100 shown in FIG. 1, the plurality of light sources 102 are located in a region 202 beneath a central portion 204 of the one-dimensional linear batwing lens 104. Referring just to FIG. 2 now, in some embodiments, the distance between the top of a light source $102_1$ (e.g., a single LED or a chip of LEDs) located in the region 202, measured from the center 206 of the light source $102_1$, and the bottom edge of the one-dimensional linear batwing lens 104 (i.e., the part of the one-dimensional linear batwing lens 104 that is facing towards the plurality of light sources), measured from the center 208 of a bottom edge 290 of the one-dimensional linear batwing lens 104, is 3.2 millimeters.

As used throughout, the term retrofit-style lamp is one where a conventional light source in an existing fixture is replaced by an LED-based light source and appropriate changes may be further required to at least one of the ballast and/or the power supply of the existing fixture, so as to allow the fixture to properly power and operate the LEDs. Thus, a retrofit-style lamp replaces the conventional light source, and in some embodiments, may require the existing ballast and/or power supply of the existing fixture to also be replaced. In contrast, a retrofit lamp would replace the conventional light source in an existing fixture with an LED-based light source, but would not require any changes to the already-existing ballast and/or power supply of the conventional fixture.

A one-dimensional linear batwing lens, such as the one-dimensional linear batwing lens 104 shown in FIGS. 1-3, will now be described in more detail. A one-dimensional linear batwing lens is a batwing style lens that is extended in one dimension in a linear direction so as to be used with more than a single light source and to produce, through beam shaping, a substantially batwing and/or batwing-type distribution from how many ever light sources are used. The distribution produced by a one-dimensional linear batwing lens is a substantially batwing distribution that is substantially uniform within a defined space, such as but not limited to the interior of a refrigeration case (not accounting for the reflective and/or blocking effects of anything contained within the defined space). The substantial uniformity of the distribution is such that the light, as beam shaped by the one-dimensional linear batwing lens, fills up a defined space. The one-dimensional linear batwing lens 104 is extrudable, which results in less expensive tooling costs when the lens is formed. The one-dimensional linear batwing lens 104 may be made of, for example but not limited to, any transparent polymer that is extrudable, may be connected to a housing without affecting the batwing dispersion of light produced, and is resistant to the heat produced by the plurality of light sources. In some embodiments, the one-dimensional linear batwing lens 104 is made from an acrylic, a polycarbonate (i.e., plastic), or glass, or some combination thereof.

In some embodiments, the extrudable one-dimensional linear batwing lens 104 is co-extrudable, that is, one portion of the lens is made from a first material and the other portion of the lens is made from a second material. Thus, for example, the one-dimensional linear batwing lens 104 may be made of both an acrylic and a polycarbonate. In such embodiments, the co-extrudable one-dimensional linear batwing lens may be comprised of a first portion and a second portion. The first portion is comprised of a first material and the second portion is comprised of a second material. The one-dimensional linear batwing lens 104 may be divided into two portions by a straight plane that intersects (i.e., crosses) the entirety of the one-dimensional linear batwing lens 104 in any direction. The one-dimensional linear batwing lens 104 may, alternatively, be divided into two portions by a curved surface that intersects (i.e., crosses) the entirety of the one-dimensional linear batwing lens 104 in any direction. Thus, in some embodiments, the division of the one-dimensional linear batwing lens 104 may be into equal portions (e.g., two halves, each of the same size) or into two unequal portions. In some embodiments, the one-dimensional linear batwing lens 104 may be formed of more than two materials, and thus may be divided into more than two portions, where each portion is made of a different material. Further, in some embodiments, the one-dimensional linear batwing lens 104 may be made of two materials, but may include more than two portions. Thus, instead of being divided by, for example, a single intersecting plane, the one-dimensional linear batwing lens 104 in such embodiments may be divided by a plurality of intersecting planes, where each plane crosses two distinct outer boundaries of the one-dimensional linear batwing lens 104. Of course, any type of dividing shape may be used. For example, if looking at the cross-section shown in FIG. 2, there may be a first plane (not shown) that intersects the one-dimensional linear batwing lens 104 in a vertical direction (i.e., from top to bottom, or vice versa), and there may be a second plane that intersects the one-dimensional linear batwing lens 104 in a horizontal direction (i.e., from left to right, or vice versa). This would create four distinct portions of the one-dimensional linear batwing lens 104, and each portion may be made from a different material, or one portion may be made of a first material and the remaining portions from a second material, or two portions may be made of a first material and the remaining portions from a second material, and so on.

In some embodiments, the one-dimensional linear batwing lens 104 may be made of a material (e.g., acrylic), but may still be divided into portions (two or more). In such embodiments, each portion of the one-dimensional linear batwing lens 104 will be made of the material, but a first portion may include a first filter, a second portion may include a second filter, and so on. As described above with regards to how different materials may be used for the one-dimensional linear batwing lens 104, similarly, different filters may be applied to different portions of the one-dimensional linear batwing lens 104 in any combination. A filter may include, but is not limited to, different colors, different textures, different diffusion levels, and so on.

As described above, the one-dimensional linear batwing lens 104 may be divided into different portions, for example, into two different portions by a horizontal plane that divides the one-dimensional linear batwing lens 104 into an upper portion 170 and a lower portion 172 (shown in FIG. 2), where the upper portion 170 is located farther from the plurality of light sources 102 than the lower portion 172. The upper portion 170 may then be divided into a first non-planar section and a second non-planar section, for example by a vertical plane that bisects the upper portion 170 (not shown). Thus, the one-dimensional linear batwing lens 104 may be said to be bi-modal. The upper portion 170, as shown in FIG. 2, may include a dip 174 that is created by the shape of the outermost edge of the upper portion 170 (i.e, the edge of the one-dimensional linear batwing lens 104 that is farthest from the plurality of light sources 102 and may be touched by a person holding the retrofit-style lamp 100). The dip 174 may be characterized by an angle. For example, the angle of the dip 174 may be between 0° and 180° not inclusive of the end points. In some embodiments, the first non-planar section and the second non-planar section may be similarly shaped, as is shown in FIG. 2. In some embodiments, the first non-planar section and the second non-planar section are of different shapes (not shown). For example, the first non-planar section may have a top surface that is shaped like a parabola, and the second non-planar section may have a top surface that is shaped like a half-circle, so long as the shape produces the desired batwing-like dispersion. Thus, the upper portion 170 may, at its outermost edge, have any shape that produces the desired batwing-like dispersion. The lower portion 172 may similarly be of any non-linear shape that results in two cylindrical arcs that are not tangent at the joint (i.e., not a continuous cylindrical arc). The outermost edge of the lower portion 172 (i.e., the edge closest to the plurality of light sources 102) may thus be of any non-linear shape, as long as it corresponds to the shapes of the upper portion 170 of the lens, because the upper portion 170 and the lower portion 172 work together to produce the desired batwing dispersion. Of course, changing the shape of the one-dimensional linear batwing lens 104 may result in changes to the width and/or the thickness of the one-dimensional linear batwing lens 104.

In an example embodiment, the one-dimensional linear batwing lens 104 measures 1.386 inches at its widest point (i.e., in a horizontal direction), and measures 0.536 inches at its tallest point (i.e., in a vertical direction), 0.358 inches without including the height of the post $222_3$ or $222_4$. The radius of curvature at the dip 174 is R.047, while the radius of curvature at a first curved edge 280 and a second curved edge 282 of the upper portion 170 is R.656, as well as the radius of curvature at a side edge 284. In embodiments where the upper portion 170 is equal on both sides of the dip 174, the same radii of curvature are found on both sides of the upper portion 170. The space between the upper portion 170 at the dip 174 and the center 208 of the bottom edge 290 of the one-dimensional linear batwing lens 104 is 0.100 inches. The radius of curvature of the bottom edge 290 on either side of the center 208 is R.698. In embodiments where the one dimensional linear batwing lens 104 includes posts 222 to connect to the housing 106, the distance between a side edge 292 of the post $222_3$ and a side edge 294 of the post $222_4$ is 1.310 inches plus or minus 0.020 inches.

In some embodiments, the retrofit-style lamp 100 may include only a single endcap and a single electrical connector at one end, with the other end including only a closure that seals off the interior of the retrofit-style lamp 100. Further, in some embodiments, a number of lens-housing combinations, each including a distinct plurality of light sources and a distinct one-dimensional linear batwing lens, may be placed side-by-side, or otherwise combined together, and then joined to the same endcap/pair of endcaps, and/or the same electrical connector/pair of electrical connectors, to form a retrofit-style lamp. Thus, in some embodiments, the retrofit-style lamp may have a generally linear shape, as the retrofit-style lamp 100 shown in FIG. 1, while in other embodiments, the retrofit-style lamp may have a non-linear shape (for example, but not limited to, an "X" shape, a "+" shape, an "*" shape, a "" shape, and so on). In such embodiments, each distinct arm/leg/side of the shape includes at least one one-dimensional linear batwing lens, such that if the arm/leg/side were separated from the rest and provided power, a batwing dispersion would be produced by at least two source of light associated with the lens.

Figure 4:
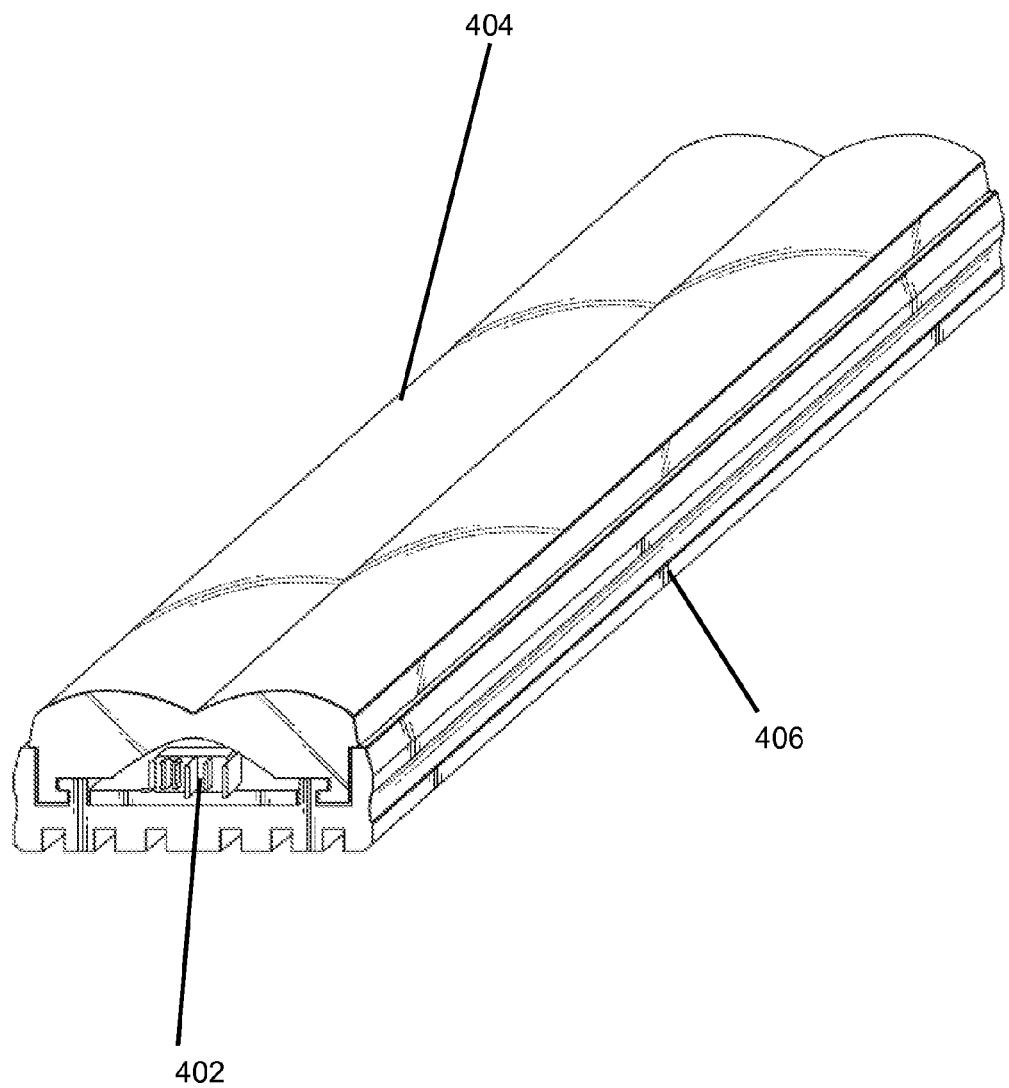
FIG. 4 shows a profile view of a section of a light fixture having a housing including attached light sources and an attached one-dimensional linear batwing lens, wherein the light sources are powered and the interior of the housing is not visible though the lens.

In some embodiments, instead of being configured as a lamp, such as the retrofit-style lamp 100 shown in FIG. 1, the pair of electrical connectors 112 and 114 and the endcaps 108 and 110 may be removed from the retrofit-style lamp 100 to create a fixture 400, a portion of which is shown in FIG. 4. The fixture 400 thus includes a plurality of light sources 402 (only one of which is shown in FIG. 4), a one-dimensional linear batwing lens 404, a housing 406, and a power supply (not shown). The power supply is connectable to the housing 406, and provides power to the fixture 400, and more specifically, to the plurality of light sources 402. The plurality of light sources 402 is located in a region defined, at least in part, by the housing 406, and the plurality of light sources 402 receive power from the power supply. The one-dimensional linear batwing lens 404 is coupled to the housing 406, and beam shapes light emitted by at least two light sources of the plurality of light sources 402. The plurality of light sources 402, the one-dimensional linear batwing lens 404, and the housing 406 each share the same properties and/or configurations (and/or potential properties and/or configurations) as those of the corresponding components (i.e., the plurality of light sources 102, the one-dimensional linear batwing lens 104, and the housing 106) for the retrofit-style lamp 100 shown in FIG. 1. The one-dimensional linear batwing lens 404 of the fixture 400 provides a substantially uniform distribution of light within a space defined in part by an enclosed storage structure (not shown), such as but not limited to a refrigeration case, by beam shaping light emitted by the plurality of light sources 402. Though the portion of the fixture 400 shown in FIG. 4 is open, such that it is possible to see inside the fixture 400, the fixture 400 is fitted with housing closures (not shown in FIG. 4) that seal the interior of the fixture 400. Of course, such housing closures allow for power to be provided from the power supply to the plurality of light sources 402 located in the interior of the fixture 400, for example through the use of one or more wires, or any other suitable electrical transmitters.

It is instructive to provide a specific, non-limiting example of a one-dimensional linear batwing lens, and to provide explanations of the functions of the various features on the example lens. The example lens, shown in FIGS. 5-9, is assumed to be generally one-dimensional, meaning that the focusing or redirection effects of the lens are in the plane of the page and that there are no focusing or redirection effects out of the plane of the page, and is assumed to be left-right symmetrical. Following the symmetrical one-dimensional example of FIGS. 5-9, rotationally symmetric and asymmetric examples are shown in FIGS. 10-13. Embodiments of the example one-dimension linear batwing lens shown in FIGS. 5-9 may be used within the fixture 400 and/or the retrofit-style lamp 100 without limitation.

For the particular example, it is desired that most of the light emerging from the lens emerges at relatively high angles with respect to a plane of symmetry down the middle of the lens. With respect to the geometry shown in FIGS. 2-4, it is desired that the emergent light be split so that about half propagates to the "left", about half propagates to the "right", and very little propagates directly "up" from the lens. Such a propagation distribution may be useful for applications such as, but not limited to, grocery store beverage coolers or freezer cases, where the lens fixture may be mounted along an edge of the cooler and may provide illumination for contents on the shelves in the interior of the cooler.

The lens in this non-limiting example described with regards to FIGS. 5-9 is in the shape of a "generalized cylinder", meaning that a normal cross-section of the lens has the same size and shape for all longitudinal locations along the lens. Note that as used herein, the term "generalized cylinder" is different from the common usage of "cylinder", which commonly refers to objects or surfaces having a circular cross-section.

Figure 5:
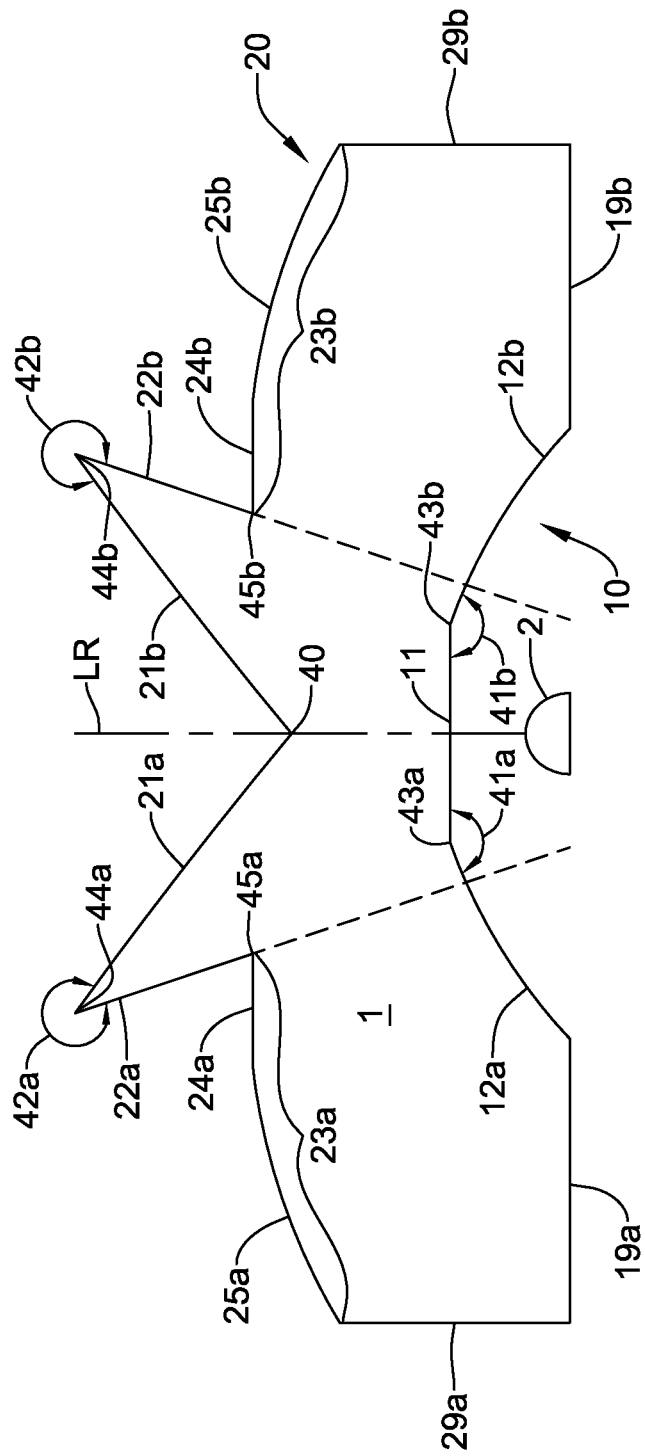
FIG. 5 is a planar cross-section of a one-dimensional linear lens according to embodiments disclosed herein, oriented such that the plane of the page is perpendicular to the line of light sources.

FIG. 5 is a planar cross-section of an exemplary lens 1, taken so that the plane of the page is perpendicular to the line of light sources 2, and the line of light sources 2 extends directly out of and into the page. For this example, the light sources 2 themselves may be solid state light sources, such as but not limited to light emitting diodes (LEDs), some or all of which may be encapsulated inside generally hemispherical caps so that each LED is at or near the center of a respective hemisphere. Alternatively, each cap may have more than one LED at or near its center. As a further alternative, the cap may be absent.

Light emergent from the light sources 2 strikes an incident face 10 of the lens. A planar cross-section of the incident face 10, taken perpendicular to the line of the light sources 2, is shown in FIG. 5. The incident face 10 has a central portion 11 that straddles the left-right symmetry plane LR of the lens. In some cases, the central portion 11 is essentially planar and essentially perpendicular to the left-right symmetry plane LR, to within typical manufacturing and alignment tolerances. In other cases, the central portion 11 may be convex or concave, typically being perpendicular to the left-right symmetry plane LR at the left-right symmetry plane LR. In most cases, regardless of the curvature of the central portion 11 of the incident face 11, light emergent from the source 2 that strikes the central portion 11 refracts through the central portion 11 and is transmitted to particular regions of the exiting face 20 (shown with sample rays traced in FIGS. 6-7).

A pair of concave peripheral portions 12a, 12b extends from opposite sides of the central portion 11. In some cases, the peripheral portions 12a, 12b are truly cylindrical, meaning that their cross-sections are circular in shape. In other cases, the peripheral portions 12a, 12b may have cross-sections that are concave but deviate from true circularity. Note that at the edges between the central portion 11 and the respective peripheral portions 12a, 12b, the incident face 10 may not have a smoothly-changing surface slope, but instead may have a surface slope discontinuity, or, in other words, a corner 41a, 41b. Such a corner may be useful for directing particular light rays to particular regions on the exiting face (shown in FIGS. 6-8). In some embodiments, the corner 41a, 41b at the interfaces between the central portion 11 and the respective peripheral portions 12a, 12b forms an obtuse angle 43a, 43b in air, i.e., an angle between 90 degrees and 180 degrees.

A pair of generally flat planar portions 19a, 19b connects to the outermost edges of the peripheral portions 12a, 12b. Typically, the only light that strikes these planar portions 19a, 19b is reflected from the exiting face 20 of the lens. That is, typically, no light emitted from the source 2 directly strikes the planar portions 19a, 19b without first being redirected from some other part of the lens 1. In some embodiments, the flat planar portions 19a, 19b may be used for mechanical purposes, such as but not limited to bonding to a supporting structure (not shown in FIG. 5). In some embodiments, the flat planar portions 19a, 19b extend to the outermost lateral periphery of the incident face 11.

The lens 1 may have lateral edges 29a, 29b, extending between the incident face 10 and the exiting face 20 along a plane essentially parallel to the left-right symmetry plane LR. As with the planar portions 19a, 19b of the incident face 10, the lateral edges 29a, 29b typically do not receive any light directly from the light source 2 without the light first being redirected from another element on the lens 1. In some embodiments, the lateral edges 29a, 29b may be used for mechanical support of the lens 1.

In some embodiments, an opaque light baffle (not shown) may extend around the lateral edges 29a, 29b of the lens 1 and across the entire incident face of the lens, where the source 2 is also disposed inside the baffle. Such a baffle may block stray rays from exiting the light fixture in extraneous directions, away from the desired target for the light.

Figure 6:
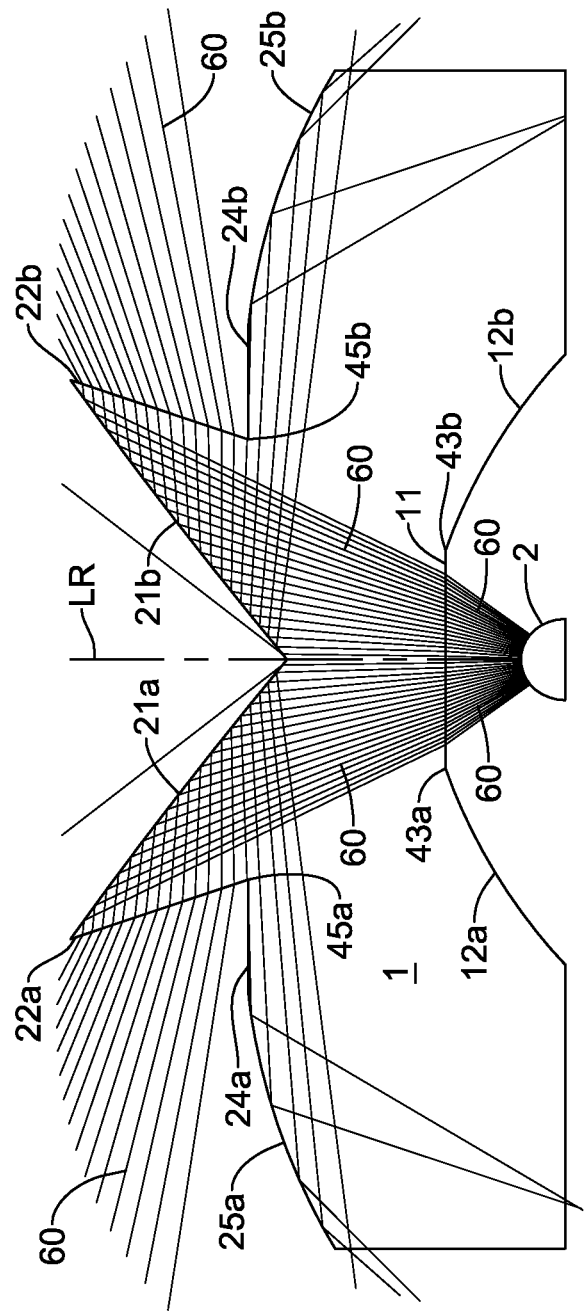
FIG. 6 is a cross-sectional drawing of the lens of FIG. 5, superimposed with traced rays from the central portion of the emergent cone from the source.
Figure 7:
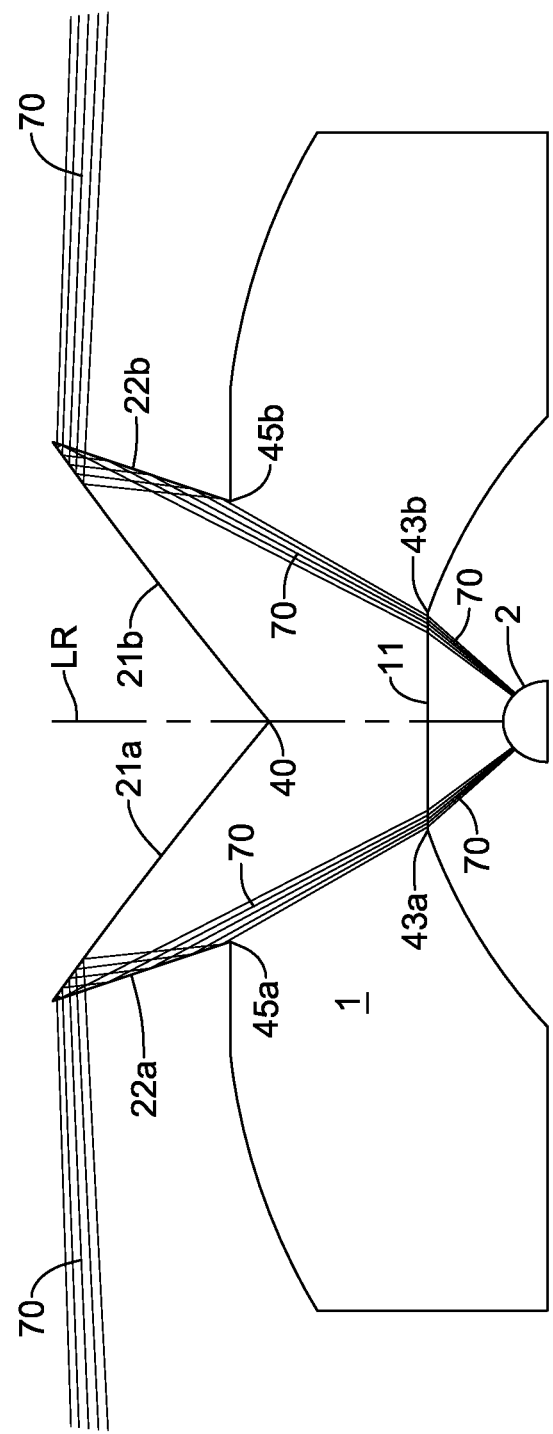
FIG. 7 is a cross-sectional drawing of the lens of FIG. 5, superimposed with traced rays from an intermediate portion of the emergent cone from the source.
Figure 8:
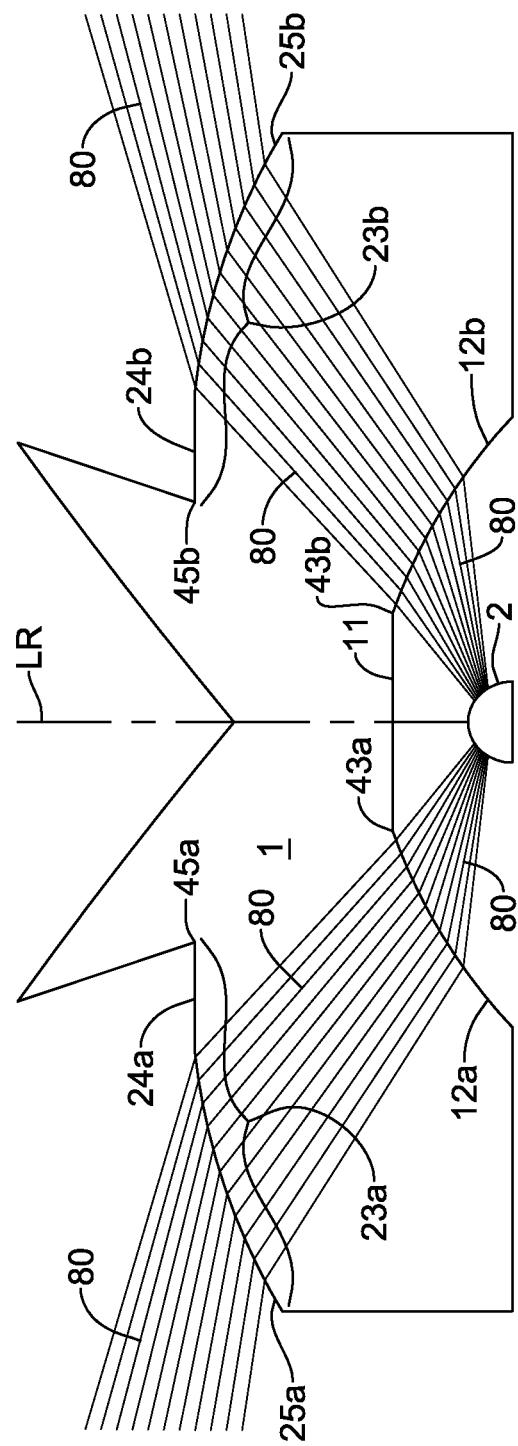
FIG. 8 is a cross-sectional drawing of the lens of FIG. 5, superimposed with traced rays from an outer portion of the emergent cone from the source.

The exiting face 20 of the lens 1 is opposite the incident face 10, and thus faces away from the light source 2. The exiting face 20 includes various structures or elements, with each element performing a different optical task. The elements are first described below with respect to their physical characteristics; their optical functions with respect to traced rays are shown in FIGS. 6-8.

At the center of the exiting face 20 are a pair of central surfaces 21a, 21b that intersect at a concave corner 40 along the left-right symmetry plane LR and typically form an obtuse angle (i.e., between 90 degrees and 180 degrees) in air at their intersection. Alternatively, the central surfaces 21a, 21b may form a right angle or an acute angle (i.e., less than 90 degrees) at their intersection, or an angle of 180 degrees or more. The central surfaces 21a, 21b are typically slightly convex, although they may alternatively be planar or slightly concave.

At the lateral edges of the central surfaces 21a, 21b, a pair of high-incident-angle surfaces 22a, 22b extend generally back toward the light source 2. The central surfaces 21a, 21b and respective high-incident-angle surfaces 22a, 22b form an angle 42a, 42b in air greater than 270 degrees at their intersection, and form convex wedges at respective corners 44a, 44b. Note that the high-incident-angle surfaces 22a do not point directly at the light source, but point generally toward them, so that if one were to extend the high-incident-angle surfaces 22a, 22b toward the incident face 10 of the lens and beyond, they would intersect each other outside the lens 1, beyond the incident face 10 of the lens 1 and beyond the light source 2. The high-incident-angle surfaces 22a, 22b are typically planar, although they may alternatively be slightly convex or slightly concave.

Extending away from the edges of the high-incident-angle surfaces 22a, 22b at corners 45a, 45b are a pair of partially curved surfaces 23a, 23b. Each partially curved surface 23a, 23b has a generally flat portion 24a, 24b directly adjacent to the respective high-incident-angle surface 22a, 22b, and has a convex portion 25a, 25b extending from the respective generally flat portion 24a, 24b. In some cases, the generally flat portions 24a, 24b extend perpendicular to the left-right symmetry plane LR. In other cases, the generally flat portions 24a, 24b may be inclined in either direction away from perpendicular to the left-right symmetry plane LR. Each partially curved surface 23a, 23b may have a smoothly-changing surface slope at the interface between the generally flat portion 24a, 24b and the respective convex portion 25a, 25b. Alternatively, each partially curved surface 23a, 23b may have a discontinuity in surface slope, or, in other words, a corner, between the generally flat portion 24a, 24b and the respective convex portion 25a, 25b. Although the generally flat portions 24a, 24b are typically essentially planar, they may alternatively be slightly convex or slightly concave. The convex portions 25a, 25b extend out to the lateral edges 29a, 29b of the lens 1.

In many embodiments, the flat portions 24a, 24b do not serve an optical purpose, but instead simplify the manufacturing process for the lens 1. In some embodiments, the lens 1 may be molded, where it may be desirable to have partially curved surfaces 23a, 23b that increase monotonically in height (or at least do not decrease in height at any point) from the outside edges 29a, 29b to the corners 45a, 45b. The point on the respective partially curved surface 23a, 23b that is longitudinally the farthest away from the light source 2 is at the respective corner 45a, 45b.

Having described the physical structures of the incident face 10 and exiting face 20 of the lens 1, the functional aspects of each structure are now described with regards to FIGS. 6-8. In general, a cone of rays exits the source, typically from the center of the hemispherical cap of the source 2. For typical solid state light sources, such as but not limited to light emitting diodes, more light is emitted "on-axis" (i.e., parallel to the left-right symmetry plane LR) than "off-axis" (i.e., at an angle with respect to the left-right symmetry plane LR). It is a design goal of the present example lens 1 to alter the light distribution so that more light emerges from the exiting face 20 of the lens 1 "off-axis" than "on-axis". For the specific design shown in FIG. 6, most of the light emerges at a relatively high angle with respect to the left-right symmetry plane LR, typically 45 degrees or higher. The ray paths through the lens are shown in FIGS. 6-8 for three groups of light rays, each group representing a different portion of the cone of light rays that exit the source 2.

FIG. 6 is a cross-sectional drawing of the lens 1 of FIG. 5, superimposed with traced rays from the central portion 60 of the emergent cone from the source 2. For the particular central bundle of rays 60, light emerges from the source 2, strikes and refracts through the central portion 11 of the incidence face 10, transmits through the lens 1 to the central surfaces 21a, 21b on the exiting face, and totally internally reflects from the central surfaces 21a, 21b. The outermost portion of the particular central bundle then strikes and refracts through the high-incident-angle surfaces 22a, 22b, and exit the lens. The innermost portion of the particular central bundle strikes the convex portions 25a, 25b of the partially curved surfaces 23a, 23b on the exiting face 20 of the lens 1, where they are totally internally reflected. The internally reflected rays are directed toward the incident face 20 or the lateral edges 29a, 29b of the lens 1, where they may exit the lens 1 and may be blocked by an optional light baffle (not shown).

There are several design principles that may be employed so that the central bundle of rays may follow the paths shown in FIG. 6. First, it is desirable that rays in this bundle do not exit between the central surfaces 21a, 21b, parallel to the left-right symmetry plane LR. This is typically achieved by making the corner between the surfaces 21a and 21b as sharp as possible. In practice, there is usually a finite radius of curvature at the corner between the surfaces 21a and 21b, which is often dictated by manufacturing conditions and process tolerances. In general, it is preferable to keep the radius of curvature as small as is practical, typically without significantly increasing the cost of the manufacturing process. Second, it is desirable that rays that strike the central surfaces 21a, 21b undergo total internal reflection. The condition for total internal reflection dictates that the incident angle, formed with respect to a local surface normal, exceeds the critical angle. The critical angle for the lens is $\sin^{-1}(1/n)$, where n is the refractive index of the lens. For typical refractive indices in the range of 1.4 to 1.7, the corresponding critical angles are in the range of about 36 degrees to about 45 degrees. The critical angle determines the maximum angle at the corner between the central surfaces 21a and 21b. In general, the maximum corner angle that can still ensure total reflection on either side of the left-right symmetry plane LR is (180 degrees−2×the critical angle); for refractive indices of 1.4 to 1.7, and corresponding critical angles of 36 degrees to 45 degrees, the maximum corner angle is 102 degrees to 90 degrees. Third, it is desirable that the generally flat portions 24a, 24b be roughly parallel to the adjacent rays reflected from the central surfaces 21a, 21b, so that no rays from the central bundle of FIG. 6 strike the generally flat portions 24a, 24b. The generally flat portions 24a, 24b may be beneficial in that they can simplify the molding process for the lens 1.

FIG. 7 is a cross-sectional drawing of the lens 1 of FIG. 5, superimposed with traced rays from an intermediate portion 70 (also referred to herein as a particular intermediate bundle of rays 70) of the emergent cone of light from the source 2. For the particular intermediate bundle of rays 70, light emerges from the source 2, strikes the high-incident-angle surfaces 22a, 22b at a high angle of incidence (hence the name for said surfaces), totally internally reflects off the high-incident-angle surfaces 22a, 22b, totally reflects off the central surfaces 21, 21b, refracts through the high-incident-angle surfaces 22a, 22b, and exits the lens 1. During the design phase of the lens 1, the angles of the central surfaces 21, 21b and the high-incident-angle surfaces 22a, 22b should be chosen to ensure that the incident angle, with respect to a local surface normal, exceeds the critical angle for each desired total internal reflection.

Note that for the lens embodiments shown in FIGS. 5-8, relatively few rays emergent from the source 2 directly strike the high-incident-angle surfaces 22a, 22b. In other embodiments, the high-incident-angle surfaces 22a, 22b may be completely obscured with respect to the source 2, so that no rays emergent from the source 2 directly strike the high-incident-angle surfaces 22a, 22b.

FIG. 8 is a cross-sectional drawing of the lens 1 of FIG. 5, superimposed with traced rays from an outer portion 80 (also referred to herein as a particular outer bundle of rays 80) of the emergent cone from the source 2. For the particular outer bundle of rays 80, light emerges from the source 2, strikes and refracts through the concave peripheral portions 12a, 12b of the incident face, transmits through the lens 1 to the convex portions 25a, 25b of the exiting face 20, refracts through the convex portions 25a, 25b, and exits the lens 1.

Note from FIGS. 7 and 8 the relative positions of the corner 43a, 43b between the central portion 11 and the peripheral portions 12a, 12b, and the corner 45a, 45b between the high-incident-angle surfaces 22a, 22b and the generally flat portions 24a, 24b. The positions of these corners 43a, 43b are chosen so that a ray leaving the source 2 and striking the central portion 11 is directed to either the central surfaces 21a, 21b or the high-incident-angle surfaces 22a, 22b, and that a ray leaving the source 2 and striking the concave peripheral portions 12a, 12b is directed to the convex portions 25a, 25b. In the embodiments of FIGS. 5-8, no rays are directed onto the generally flat portions 24a, 24b.

Figure 9:
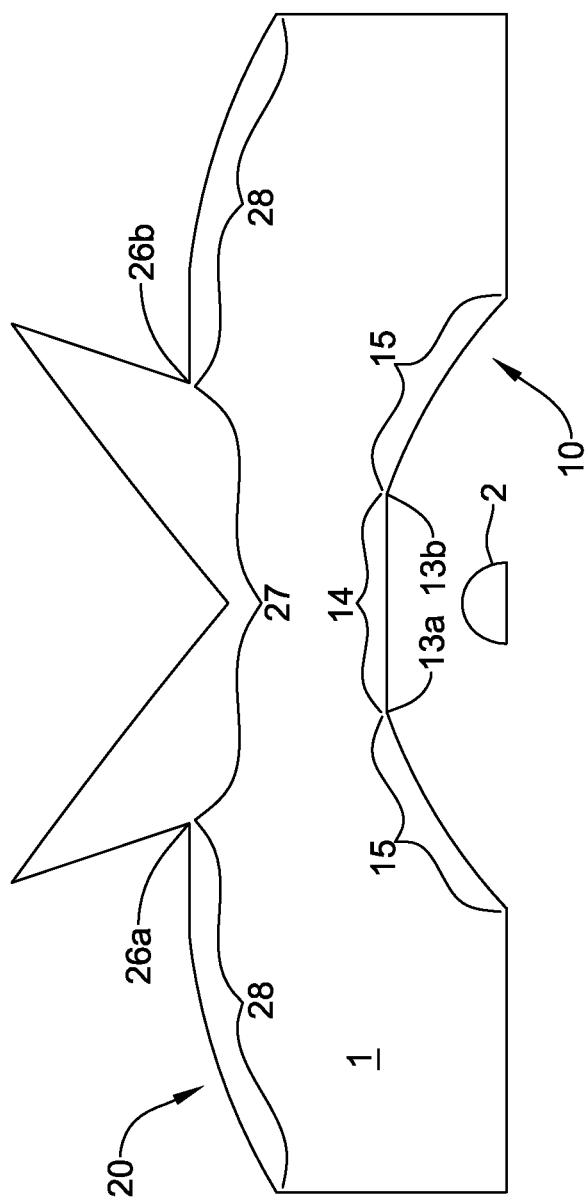
FIG. 9 is a cross-sectional drawing of the lens of FIG. 5, with element numbers denoting the pertinent corners and zones of the incident and exiting surfaces.

FIG. 9 shows the same lens as FIGS. 5-8, with element numbers 13a, 13b, 26a, 26b for the above-referenced corners. The incident face 10 has at least one corner 13a, 13b at which the local surface slope changes abruptly; such a corner 13a, 13b on the incident face 10 may be referred to as an "incident corner" 13a, 13b. Such incident corners 13a, 13b may divide the incident face 10 into an incident inner zone 14 (the central portion 11) and an incident outer zone 15 (the concave peripheral portions 12a, 12b). Similarly, the exiting face 20 has at least one corner 26a, 26b at which the local surface slope changes abruptly; such a corner 26a, 26b on the exiting face 20 may be referred to as an "exiting corner" 26a, 26b. Such exiting corners 26a, 26b may divide the exiting face 20 into an exiting inner zone 27 (the central surfaces 21a, 21b, plus the high-incident-angle surfaces 22a, 22b, which together form a convex wedge) and an exiting outer zone 28 (the partially curved surfaces 23a 23b). For each ray from the light source 2 that strikes the incident inner zone 14 and transmits through the lens 1, said ray strikes the exiting inner zone 27. For each ray from the light source 2 that strikes the incident outer zone 15 and transmits through the lens 1, said ray strikes the exiting outer zone 28.

For the light source 2 and the lens 1 of FIGS. 5-9, nearly all the light from the source 2 emerges from the lens 1 in the relatively narrow angular band of about 67 degrees to about 80 degrees, with respect to the left-right symmetry plane LR. The peak output is at about 75 degrees, with respect to the left-right symmetry plane LR. The light is evenly split on either side of the left-right symmetry plane LR. For each ray from the light source 2 that strikes the incident face 10, transmits through the lens 1, strikes the exiting face 20 and refracts out of the lens, said ray has initial and final propagation angles, formed with respect to the left-right symmetry plane LR, the final propagation angle is greater than the initial propagation angle.

Figure 12:
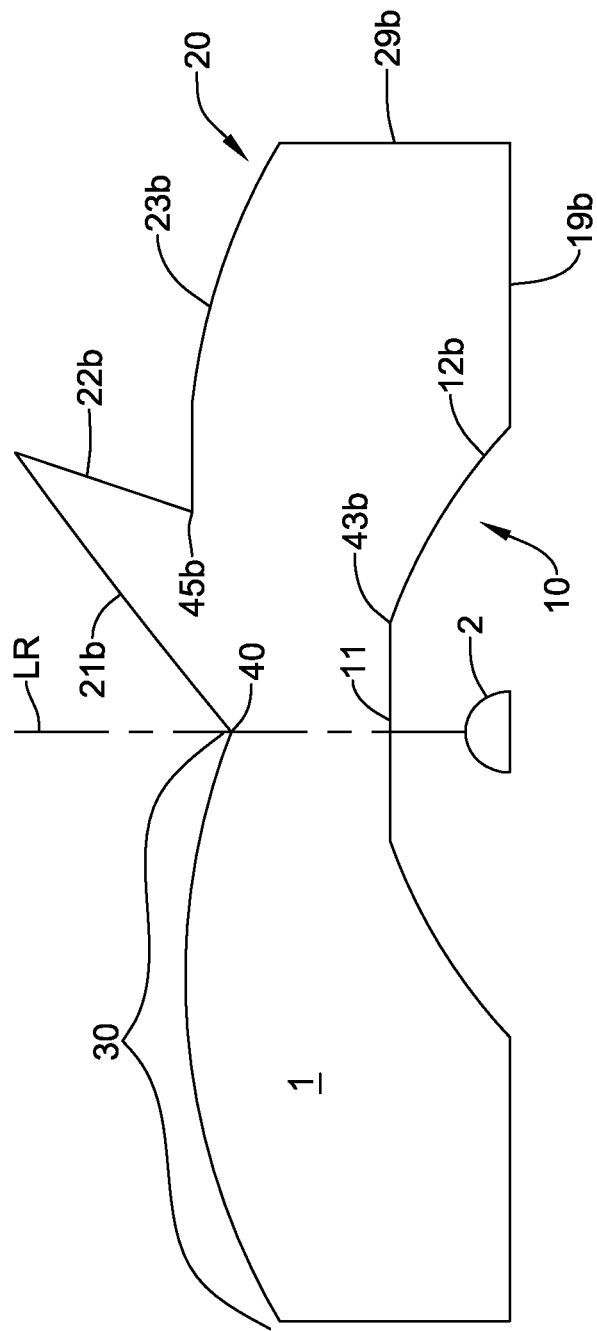
Figure 13:
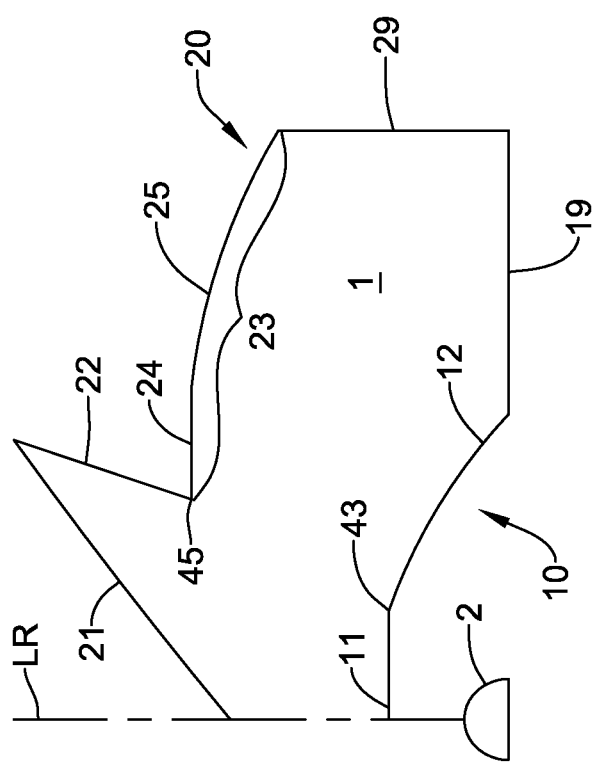

Thus far, for the example lens 1 of FIGS. 5-9, it is assumed that the lens is one-dimensional and is symmetric about a left-right symmetry plane LR. There are other examples, shown in FIGS. 10-13, where the lens is rotationally symmetric (FIG. 10) or is asymmetric (FIGS. 11-13).

Figure 10:
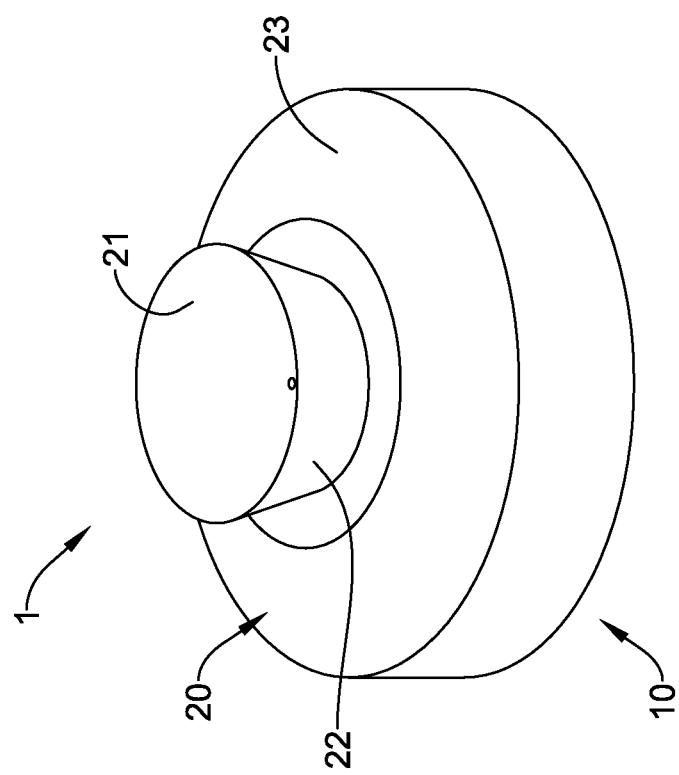
FIG. 10 shows a rotationally symmetric version of the lens of FIG. 5, according to embodiments described herein.

FIG. 10 is a plan drawing of a lens 1 having the cross-section shown in FIGS. 5-9, but being rotationally symmetric rather than left-right symmetric. Such a lens 1 may be used for an LED or a cluster of LEDs all located in a reasonably small patch, compared with the one-dimensional lenses of FIGS. 5-9 that may be used with an extended line of LEDs or other extended shapes. The output from the rotationally symmetric lens 1 of FIG. 10 is also generally rotationally symmetric, or at least has the symmetric properties of the LED or other light source.

Figure 11:
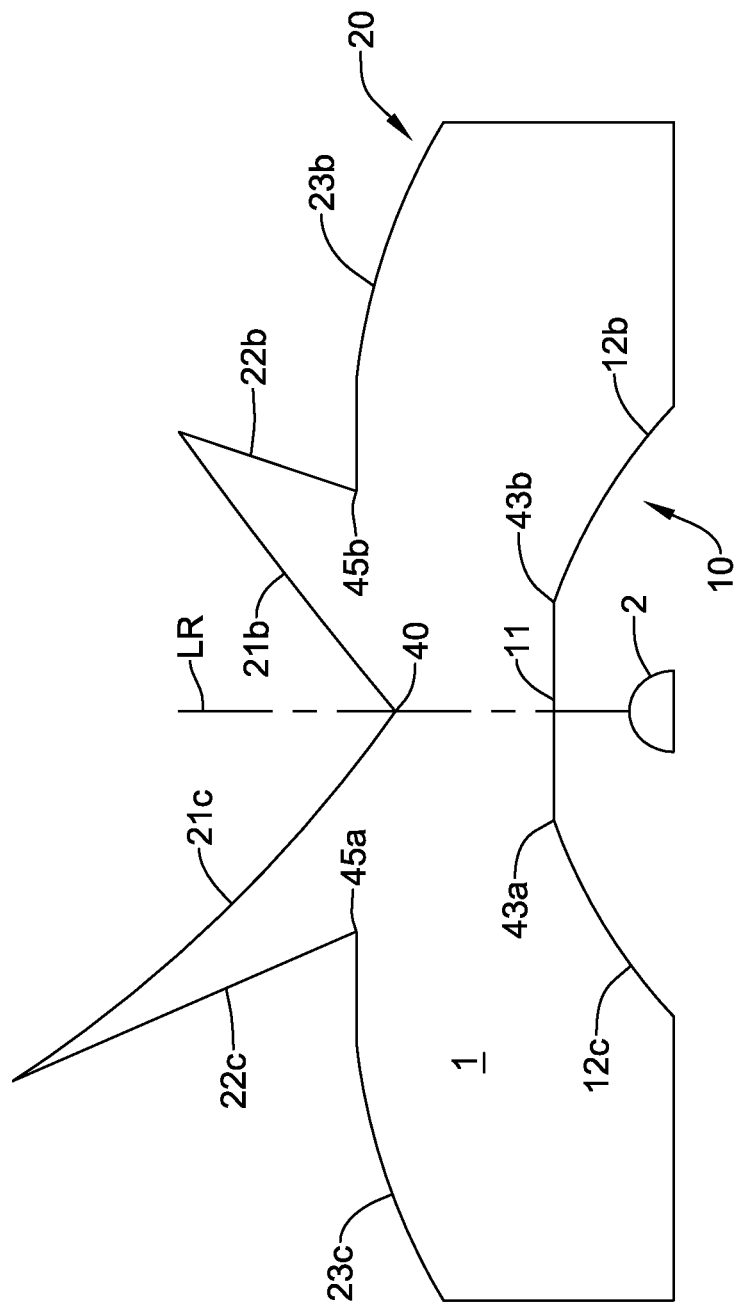
FIGS. 11-13 show various rotationally asymmetric versions of the lens of FIG. 5, according to embodiments described herein.

FIG. 11 is a cross-sectional drawing of an asymmetric lens, with elements ending in "c" being on one side of the left-right symmetry plane LR and element ending in "b" being on the other side of the left-right symmetry plane LR. It is understood that the light emission will appear different for the left and right sides of lens 1 in FIG. 11.

It is worthwhile to have a brief discussion of the "near-field" and "far-field" output from the lens. Very close to the lens, typically on the order of a few millimeters away from the lens, the light has a "near-field" pattern, in which the rays' location and direction are both important. Rays arrive at the target with a particular angle emergent from the lens. Importantly, rays also arrive from a particular "starting point" somewhere within or on the structure of the lens; the lens itself dictates where the rays to appear to originate from. Farther out from the lens, typically a few inches away from the lens, a "far-field" pattern becomes more predictive of the light distribution. In the far-field, the ray propagation direction becomes more important than the ray's apparent origination location on the lens. Many inches away from the lens, a shift in ray position produces less of an effect than when the target is very close to the lens.

One artifact of the distinction between near-field and far-field patterns is that the desired distribution along a particular target plane or target volume generally requires consideration of the near-field pattern; the ray location should be considered when possible, not just the ray propagation angle. Note that even though two lenses may have similar-looking far-field distributions (output vs. angle), their near-field patterns may differ due to features that shift the rays, such as the wedge-shaped surfaces on the exiting face of the present lens.

For the exemplary lenses presented herein, the lens may help achieve a uniform spatial distribution of light, which is illuminance (in units such as lux or foot-candle), along a particular plane, about three inches from the lens. It will be understood that the present lens may be modified to achieve whatever distribution of light is desired, for the desired area or volume to be illuminated.

FIG. 12 is a cross-sectional drawing of an asymmetric lens, with the "right" side of the lens having the cross-section described above, and the "left" side having a cross-section 30 that lacks the wedge-shaped elements on the exiting face of the lens 1.

It will be understood that any suitable elements may be used for half of the lens, and that the two halves may be designed and operate independently. For instance, FIG. 13 is a cross-sectional drawing of an asymmetric lens, having no elements on the "left" side of longitudinal axis A. In some cases, the central face along axis A may be mirrored, or may be proximate a mirror or other light-directing or absorbing element. It will be understood that the designations of "a", "b", and "c" on the elements may be used interchangeably or may be omitted entirely. For instance, corner 43 is analogous in structure and function to corners 43a and 43b from the earlier figures.

Unless otherwise stated, use of the words "substantial" and "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A lens to redirect light from at least one light source, the light having an angular distribution centered around a left-right symmetry plane, the lens comprising:
    an incident face facing the at least one light source, the incident face including at least one incident corner at which the local surface slope changes abruptly, the at least one incident corner dividing the incident face into an incident inner zone and an incident outer zone, the at least one incident corner being concave and forming an obtuse angle in air; and
    an exiting face opposite the incident face and including at least one exiting corner at which the local surface slope changes abruptly, the at least one exiting corner dividing the exiting face into an exiting inner zone and an exiting outer zone, wherein the exiting outer zone is defined by a partial curved surface extending from the at least one exiting corner, the partial curved surface including a generally flat portion adjacent the at least one exiting corner and a convex portion extending from the generally flat portion, wherein the generally flat portion is located beneath an intersection point of the exiting inner zone and extends past the intersection point;
    wherein for each ray of the light from the at least one light source that strikes the incident inner zone and transmits through the lens, the ray strikes the exiting inner zone;
    wherein for each ray of the light from the at least one light source that strikes the incident outer zone and transmits through the lens, the ray strikes the exiting outer zone; and
    wherein for each ray of the light from the at least one light source that strikes the incident face, transmits through the lens, strikes the exiting face, and refracts out of the lens, the ray has initial and final propagation angles formed with respect to the left-right symmetry plane, and the final propagation angle is greater than the initial propagation angle.

2. The lens of claim 1, wherein the lens is symmetric about the left-right symmetric plane.

3. The lens of claim 1, wherein the light has a two-dimensional angular distribution centered about a symmetry axis, and wherein the lens is rotationally symmetric about the symmetry axis.

4. The lens of claim 1, wherein the lens is asymmetric about the left-right symmetry plane.

5. The lens of claim 1, wherein for each ray of the light from the at least one light source that strikes the incident inner zone, transmits through the lens and strikes the exiting inner zone, the ray undergoes total internal reflection at the exiting inner zone.

6. The lens of claim 1, wherein the incident inner zone is essentially planar.

7. The lens of claim 1, wherein the exiting inner zone comprises a pair of surfaces that form a convex wedge.

8. The lens of claim 1, wherein the incident outer zone is concave.

9. The lens of claim 1, wherein the exiting outer zone is convex.

10. A method of redirecting light from at least one light source, the light having an angular distribution centered around a left-right symmetry plane, the method comprising:
refracting a central portion of the angular distribution through a proximal surface of a lens;
transmitting the refracted central portion through the lens;
totally internally reflecting the refracted central portion from a distal surface of the lens;
refracting the totally internally reflected central portion through the distal surface of the lens to exit the lens;
refracting a peripheral portion of the angular distribution through the proximal surface of the lens;
transmitting the refracted peripheral portion through the lens; and
refracting the transmitted peripheral portion through the distal surface of the lens to exit the lens;
wherein the distal surface of the lens includes at least one generally flat portion that does not receive any light from the angular distribution, wherein the at least one generally flat portion is beneath a high-incident-angle surface on the distal surface of the lens and extends beyond the high-incident-angle surface; and
wherein the central portion and the peripheral portion of the angular distribution refract through the distal surface on opposite sides of the generally flat portion.

11. The method of claim 10, wherein the central portion refracts through an incident inner zone on the proximal surface of the lens, then transmits through the lens, then totally internally reflects off a central surface on the distal surface of the lens, then transmits to the high-incident-angle surface on the distal surface of the lens, then refracts through the high-incident-angle surface to exit the lens.

12. The method of claim 10, wherein the central portion refracts through an incident inner zone on the proximal surface of the lens, then transmits through the lens, then totally internally reflects off the high-incident-angle surface on the distal surface of the lens, then transmits to a central surface on the distal surface of the lens, then totally internally reflects off the central surface on the distal surface of the lens, then transmits to the high-incident-angle surface on the distal surface of the lens, then refracts through the high-incident-angle surface to exit the lens.

13. The method of claim 10, wherein the peripheral portion refracts through an incident outer zone on the proximal surface of the lens, then transmits through the lens, then refracts through an exiting outer zone on the distal surface of the lens to exit the lens.

14. A lens to redirect light from at least one light source, the light having an angular distribution centered around a longitudinal axis, the lens comprising:
an incident face facing the at least one light source, wherein a planar half-cross-section of the incident face, taken perpendicular to the longitudinal axis and extending away from the longitudinal axis, comprises:
a central portion that straddles the longitudinal axis; and
a peripheral portion extending away from the central portion, the peripheral portion forming a corner with the central portion at which the local surface slope changes abruptly, the peripheral portion forming an obtuse angle in air with the central portion; and
an exiting face opposite the incident face and facing away from the at least one light source, wherein a planar half-cross-section of the exiting face, taken perpendicular to the longitudinal axis and extending away from the longitudinal axis, comprises:
a central surface forming a concave corner at the longitudinal axis;
a high-incident-angle surface extending from the central surface generally toward the at least one light source and forming a convex wedge with the central surface, the high-incident angle surface forming an angle greater than 270 degrees in air with the central surface; and
a partially curved surface extending from the high-incident-angle surface, the partially curved surface forming a corner with the high-incident-angle surface at which the local surface slope changes abruptly, the partially curved surface including a generally flat portion adjacent the exiting outer zone and a convex portion extending from the generally flat portion, wherein the generally flat portion is located beneath an intersection point formed by the intersection of the high-incident-angle surface and the central surface and extends past the intersection point.

15. The lens of claim 14, wherein the incident and exiting faces are generalized cylinders.

16. The lens of claim 14, wherein the incident and exiting faces are rotationally symmetric around the longitudinal axis.

17. The lens of claim 14, wherein the partially curved surface has a flat or monotonically decreasing surface height at each point on the partially curved surface, with respect to observation planes taken perpendicular to the longitudinal axis.

18. The lens of claim 14, wherein no light rays leaving the at least one light source and refracting through the incident face of the lens directly strike the generally flat portion.

19. The lens of claim 1, wherein the convex portion defines a first arc subtending a first angle, wherein the incident outer zone defines a second arc subtending a second angle, and wherein the first angle is different from the second angle.

20. The lens of claim 14, wherein the convex portion defines a first arc subtending a first angle, wherein the peripheral portion defines a second arc subtending a second angle, and wherein the first angle is different from the second angle.

* * * * *